United States Patent [19]

Shtipelman et al.

[11] Patent Number: 5,561,646
[45] Date of Patent: Oct. 1, 1996

[54] FOCUS/TRACKING ACTUATOR WITH MOVING-MAGNET MOTORS

[75] Inventors: Boris A. Shtipelman, Rochester; James A. Barnard, Scottsville, both of N.Y.

[73] Assignee: Eastman Kodak Company, Rochester, N.Y.

[21] Appl. No.: 411,246

[22] Filed: Mar. 27, 1995

[51] Int. Cl.$^6$ .................................................. G11B 7/095
[52] U.S. Cl. .................................... 369/44.14; 369/44.15; 359/813
[58] Field of Search ........................... 369/44.14, 44.15, 369/44.16, 44.21, 44.22; 359/814, 823, 824, 813

[56] References Cited

U.S. PATENT DOCUMENTS

| | | | |
|---|---|---|---|
| 4,759,005 | 7/1988 | Kasahara | 369/44 |
| 5,136,558 | 8/1992 | Getreuer et al. | 369/44.15 |
| 5,241,528 | 8/1993 | Mohri et al. | 369/44.15 X |
| 5,319,497 | 6/1994 | Wakabayashi et al. | 359/814 |
| 5,373,496 | 12/1994 | Tomita et al. | 369/44.15 X |

FOREIGN PATENT DOCUMENTS 0210530  9/1986  Japan .

Primary Examiner—W. R. Young
Assistant Examiner—Thang V. Tran
Attorney, Agent, or Firm—Raymond L. Owens

[57] ABSTRACT

A focus/tracking actuator for an optical or magnetooptical disk drive includes a pair of moving-magnet type linear motors for simultaneously controlling the focus and tracking positions of an objective lens used to focus a write/read beam on a desired data track of a rotating data storage disk. Each motor includes a pair of selectively energizable focus and tracking coils, one coil being positioned within the other so that its respective windings are perpendicular to those of the other coil. Flux lines emanating from a permanent magnet secured to a movably mounted lens housing interact with the electromagnetic fields surrounding both coils, and a single steel plate or the like, positioned inside the windings of both coils, facilitates the return of magnetic flux to the magnet while preventing such flux from cutting portions of the coils which would act to exert an undesired forces on the lens housing. Preferably, the steel plate is composed of two segments to facilitate winding of the coils about the plate.

4 Claims, 8 Drawing Sheets

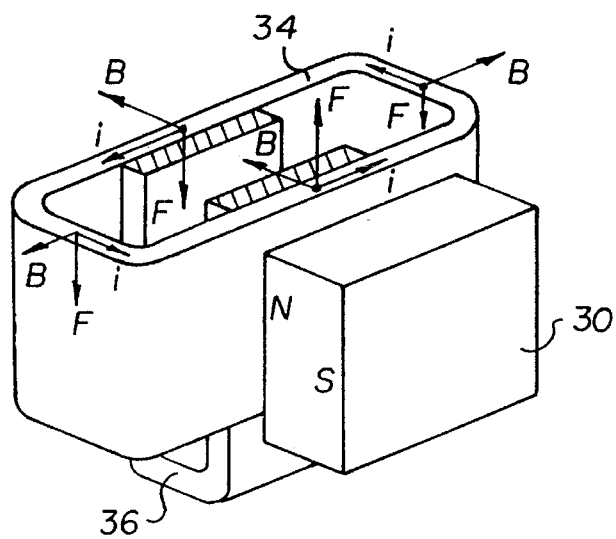
FIG. 4
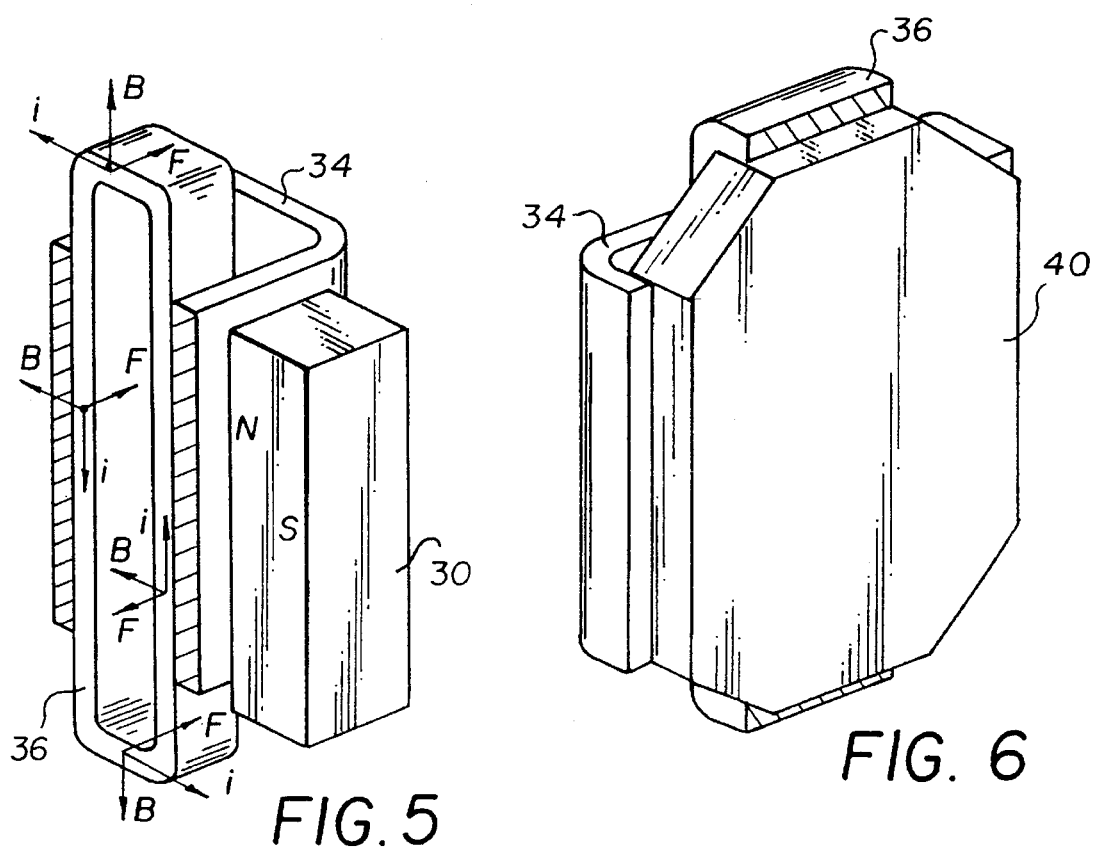
FIG. 5
FIG. 6

FOCUS/TRACKING ACTUATOR WITH MOVING-MAGNET MOTORS

BACKGROUND OF THE INVENTION

1. Field of the Invention

The present invention relates to the field of optical recording and playback and, more particularly, it relates to improvements in apparatus for both focusing a laser beam on the surface of a data storage element, such as an optical disk or tape, and controlling the radial position of the focused beam on the element so that information can be written (or read from) a desired data track.

2. Discussion of Prior Art

Heretofore, a wide variety of focus/tracking actuators have been proposed and utilized in the write/read heads of optical and magnetooptical disk drives to both maintain proper focus of a laser beam on a rapidly spinning optical recording element and control the position of the focused spot with respect to a desired data track. Typically, such actuators comprise a pair of "moving coil" linear motors which serve to adjust the position of a movably mounted objective lens along two orthogonal axes, for example, along a vertical axis to adjust the beam focus, and along a horizontal axis to control the tracking position of the beam. Each of these linear motors comprises a tiny coil of wire which is secured to the lens housing and adapted to move therewith, and one or more permanent magnets rigidly mounted on the actuator housing for producing a magnetic field which interacts with the electromagnetic field created in the vicinity of the coils when a current in the coils is caused to flow. The respective directions of the interacting fields effects movement of the lens housing along the desired orthogonal axes.

While moving coil linear motors have proven highly effective in focus/tracking actuators for controlling beam focus and placement, they are not without disadvantages. For example, due to location of the focus and tracking coils on the moving payload, flexible cables or wires must be used to deliver current to the coils. As a result, manufacturing processes become more complicated, and the useful life of these wires becomes an issue. Another disadvantage of moving coil actuators is related to the fact that some portions of focus and tracking coils lack support that quite often results in dynamic disturbances especially at high frequencies. These disadvantages are not present in focus/tracking actuators employing linear motors of the "moving-magnet" type. In such motors, the focus and tracking coils are stationary and the permanent magnet(s) moves with the motor payload, i.e., the lens housing. However, focus/tracking actuators with moving magnets have not gained wide-spread acceptance because they tend to be less efficient, in terms of power consumption, in accelerating the payload. In most designs, the lack an adequate flux carrying steel structure results in a weak magnetic field. Also, size limitation of these devices is required to diminish the attraction of the moving magnets to the surrounding steel. In extreme cases, some motors do not incorporate steel parts at all, and magnetic flux is passing through air.

Among various focus/tracking actuators with moving-magnet motors, one design is described in U.S. Patent No. 5,136,558. In this design, a pair of permanent magnets are attached to opposite sides of a movably mounted lens holder, and two pair of focus and tracking coils are arranged on a stationary base so that the respective electromagnetic fields created by the energization of the coils interact with the magnetic flux of the permanent magnets and operate to move the lens in focus and tracking directions. Here, the focus coils are circular in configuration, each having a central axis (about which the coil wire is wound) which is concentric with the lens axis. The tracking coils are elongated in shape, each having a central axis which is perpendicular to the lens axis. In this design, no provision is made, e.g., in the form of a steel structure, for facilitating the return of magnetic flux passing from one pole of the magnet, through the coil, and back to the opposite pole of the magnet. Such return is effected through the surrounding air, a medium of relatively high magnetic reluctance. As a result, this particular design is somewhat inefficient in converting electrical power to payload acceleration.

Another moving-magnet type focus/tracking actuator is disclosed in U.S. Pat. No. 4,759,005. Here, a more magnetically efficient lay-out of a moving magnet motor is utilized but at the expense of doubling the amount of focus and tracking coils and winding each of them in a planar fashion.

SUMMARY OF THE INVENTION

In view of the foregoing discussion, an object of this invention is to provide a lower cost, more readily manufacturable and more efficient focus/tracking actuator of the moving-magnet variety.

The focus/tracking actuator of the invention generally comprises: (a) a stationary base support; (b) a lens housing which supports an objective lens having an optical axis; (c) mounting means for movably mounting the lens housing on the base support for movement along two orthogonal axes; (d) permanent magnet means secured to the lens housing and adapted to produce magnetic flux from a generally planar face surface thereof in a direction generally perpendicular to the lens axis; (e) a selectively energizable first coil mounted on the base support and adapted to produce, when energized, a first electromagnetic field which interacts with the magnetic flux of the permanent magnet means to cause the lens housing to move in a first direction relative to the base support; such first coil being wound about a first axis generally parallel to the lens axis and having a first planar portion confronting the planar face surface of the permanent magnet means; (f) a selectively energizable second coil mounted on the base support and adapted to produce, when energized, a second electromagnetic field which interacts with the magnetic flux of the permanent magnet means to cause the lens housing to move in a second direction substantially perpendicular to the first direction, such second coil being wound about an axis generally perpendicular to the first axis and having a first planar portion confronting the first planar portion of the first coil; and (g) a magnetic flux-returning member positioned to receive magnetic flux emitted by the permanent magnet and crossing both of the respective first planar portions of the first and second coils, such member being configured and adapted to return a major portion of the received magnetic flux to the permanent magnet means while preventing such flux from interacting with the electromagnetic fields surrounding other portions of the first and second coils. Preferably, the magnetic flux-returning member is in the form of a steel (or some other material of high magnetic permeability) plate having a planar surface positioned adjacent to the first planar portions of the coils. Also highly preferred is that the magnetic flux-returning member is composed of a plurality of segments, whereby the coils may be readily wound about the member by a simple winding procedure.

The advantageous technical effect of surrounding certain portions of the stationary coils with a highly permeable material, is that more efficient use is made of the magnetic flux produced by the moving-magnet in accelerating the lens payload.

The invention and its various advantages will be better understood from the following detailed description of a preferred illustrative embodiment, reference being made to the accompanying drawings in which like reference characters denote like parts.

BRIEF DESCRIPTION OF THE DRAWINGS

FIGS. 4 and 5 are perspective, partial cross-sectional illustrations showing the relationship among force, magnetic flux and current at four locations in the focus and tracking coils, respectively;

FIG. 6 is a perspective, partial cross-sectional illustration of a portion of a coil assembly comprising a flux-return plate;

DETAILED DESCRIPTION OF PREFERRED EMBODIMENTS

Figure 1:
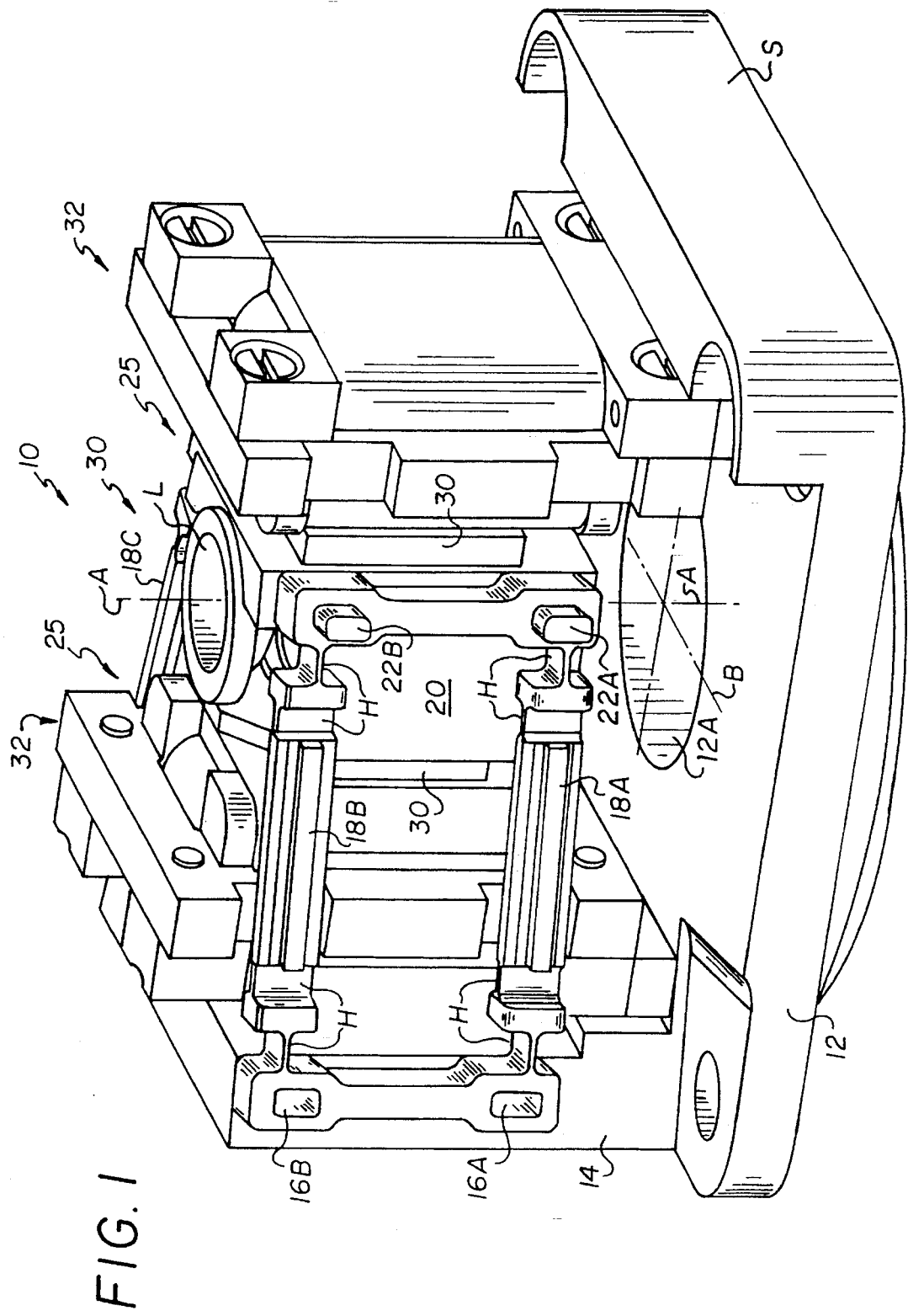
FIG. 1 is a perspective illustration of a focus/tracking actuator embodying the invention.

Referring now to the drawings, FIG. 1 depicts a focus/tracking actuator 10 embodying the present invention. Such actuator generally functions to precisely and simultaneously control the movement of an objective lens L along both its optical axis A, and along an axis B perpendicular thereto, to respectively control the focal condition and radial placement of a beam of radiant energy (not shown) used to record and/or playback information on the recording surface of a data recording disk. The actuator comprises a base support S which includes a rectangular base plate 12 having an upright portion 14 rigidly attached along one edge thereof. Upright portion 14 is provided with a four outwardly extending tabs 16A–16D which support a like number of flexure members 18A–18D. The latter movably support a lens housing 20 for the objective lens L. Each of the flexure members is provided with a plurality of flexible hinges H which limit motion of the lens housing to movement along the mutually perpendicular axes A and B. The flexure members, which are preferably made of injection-molded plastic material, are connected to the lens housing via a plurality of tabs 22A–22D extending outwardly from the lens housing. A circular opening 12A is formed in the base plate opposite the lens housing to allow passage of the read/write beam to the lens.

Movement of the lens housing relative to the actuator's base support is effected by a pair of linear motors 25 positioned on opposite sides of the lens housing. Each motor comprises the combination of a planar-shaped permanent magnet 30 and an opposing and selectively energizable coil assembly 32. Since the actuator is of the moving-magnet type, magnets 30 are secured to opposing lateral surfaces of the movably-mounted lens housing, and the coil assemblies are rigidly connected to the base support S. It is highly preferred that the magnets be oriented so that their respective magnetic poles coincide, i.e., north-south, north-south. This orientation has been found to provide a significant increase in flux density passing through the coils than would be the case were the magnetic poles of the magnets arranged in opposition, i.e., north-south, south-north, as is disclosed, for example, in the aforementioned U.S. Pat. No. 5,136,558.

Figure 2:
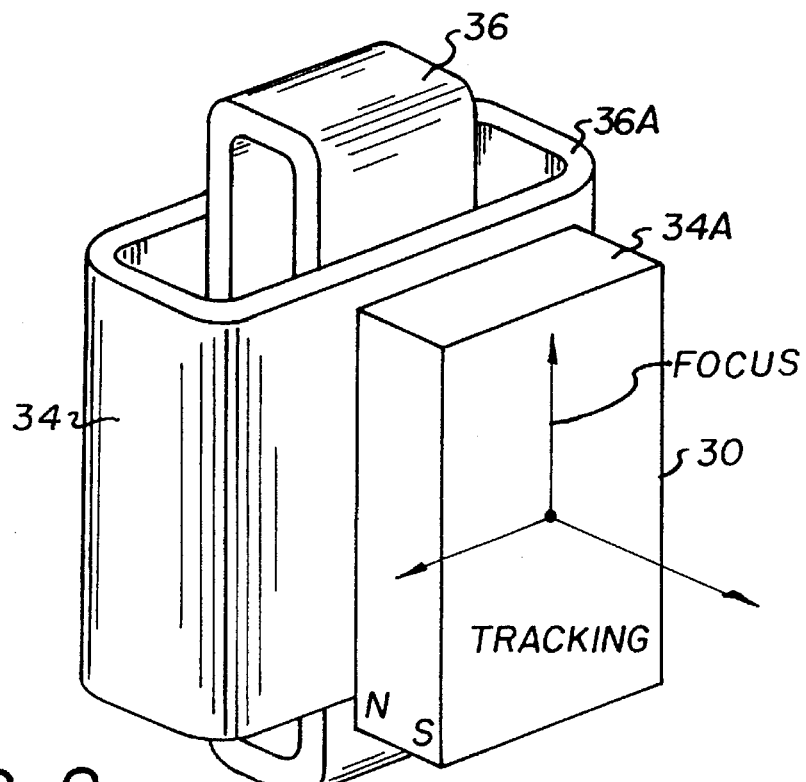
FIG. 2 is a perspective illustration of a preferred focus and tracking coil configuration and its relationship with a moving magnet comprising the actuator of FIG. 1.

Referring to FIG. 2, the coil assembly of each of the linear motors 25 is shown as comprising a focus coil 34 and a tracking coil 36. As shown, each coil has a generally rectangular cross-section, with the respective windings of the focus coil being wound about an axis which is parallel to the optical axis A of the objective lens, and with the respective windings of the tracking coil being wound about an axis which is perpendicular to axis and parallel to the cross-track axis B shown in FIG. 1. While the focus coil is shown as surrounding the tracking coil, the reverse configuration is equally useful. Each coil has a generally planar portion, 34A and 36A, which confronts the planar, flux-producing face of magnet 30.

Figure 3:
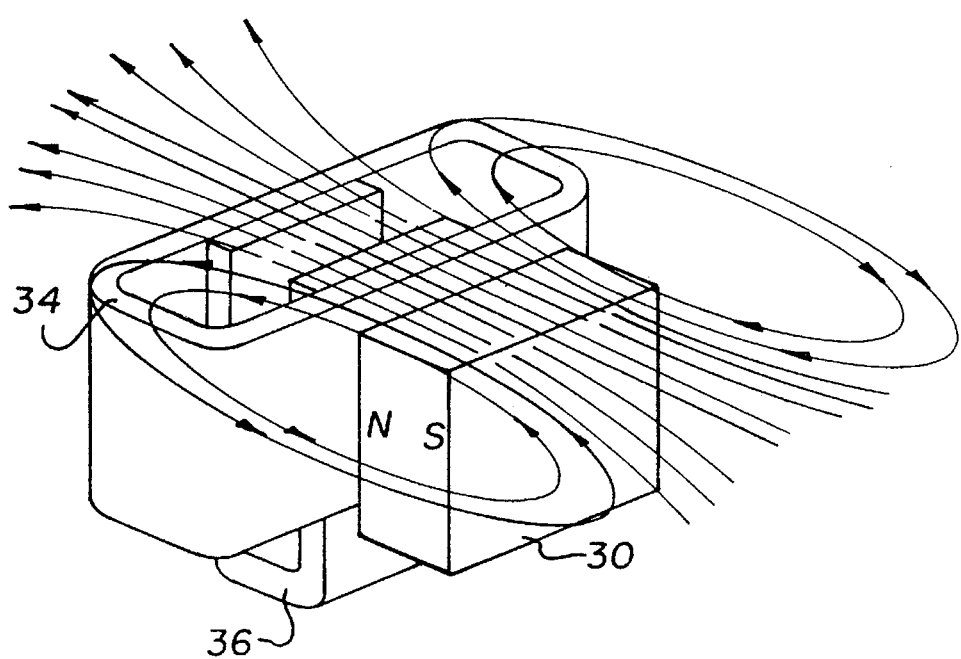
FIG. 3 is a perspective cross-sectional illustration showing the magnetic flux pattern of the FIG. 2 apparatus.

In FIG. 3, the bottom portion of one of the linear motor is shown with magnetic flux lines produced by the permanent magnet 30. As shown, the magnetic flux crosses all portions of the two coils, with the strongest flux being received by the two planar portions closest to the face of the magnet. In FIG. 4, the flux density B and the current i passing through focus coil 34, give rise to a force F exerted on the coil wires. The direction of the force on each portion of the coil is determined by the "left hand rule" and, for the direction of the current flow shown, the direction of the force will be upwards on that portion of the focus coil closest to the magnet, and downwards on the other three portions. Since a major portion of the relatively large upwards force produced on that portion of the coil closest to the magnet is cancelled by the downward force produced in the other three legs, it will be appreciated that a relatively small net force will be exerted on the coil for a given magnetic field. Obviously, the reactive force exerted on the moving magnet (since the coil assembly is stationary) will have the same small value, thereby making the motor efficiency correspondingly small. As seen in FIG. 5, a similar situation applies to the tracking coil portion of the motor.

Figure 7:
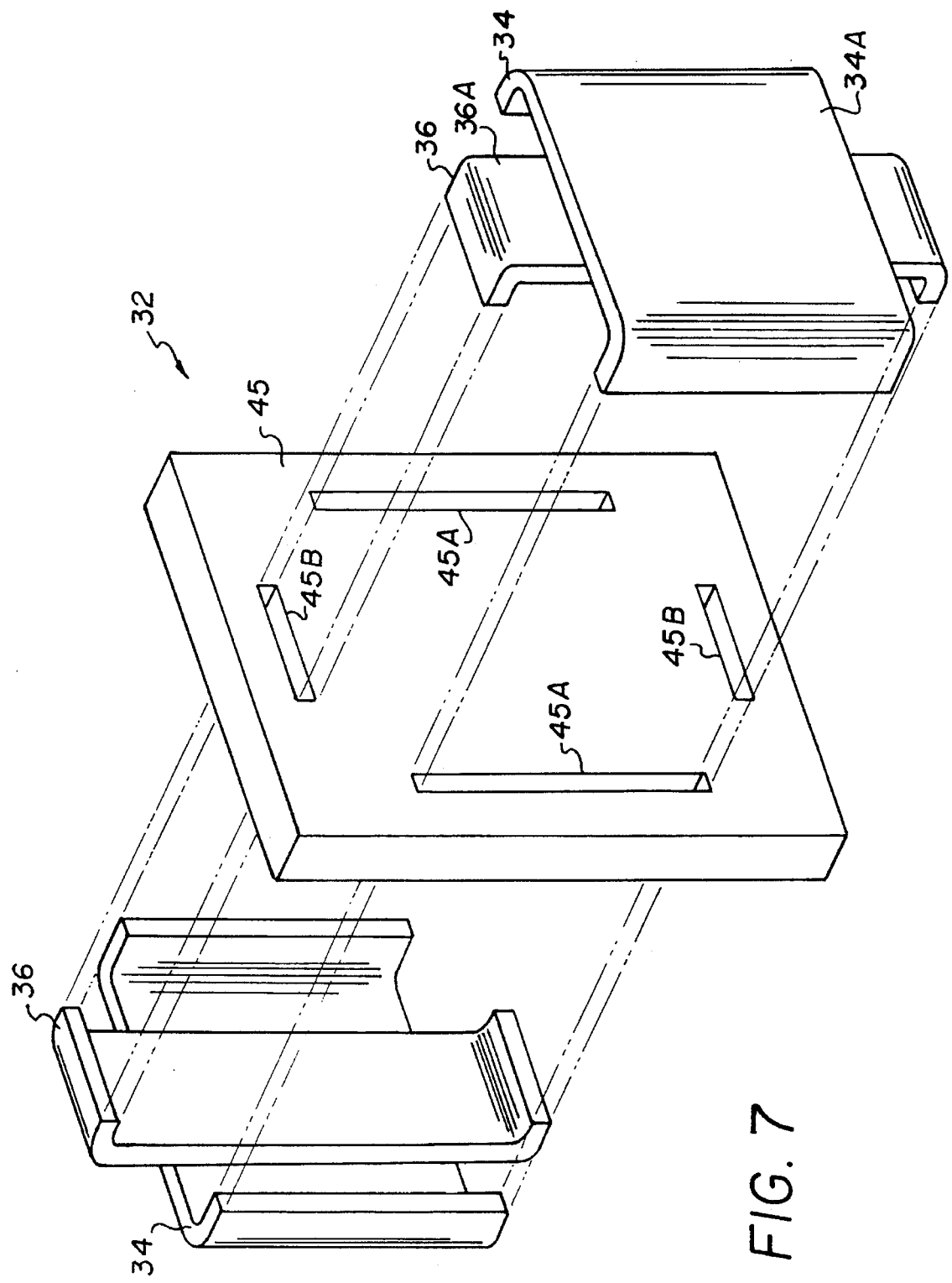
FIGS. 7 and 8 are exploded perspective illustrations showing a preferred flux-return plate configuration and the path taken by magnetic flux in returning to the magnetic source.
Figure 8:
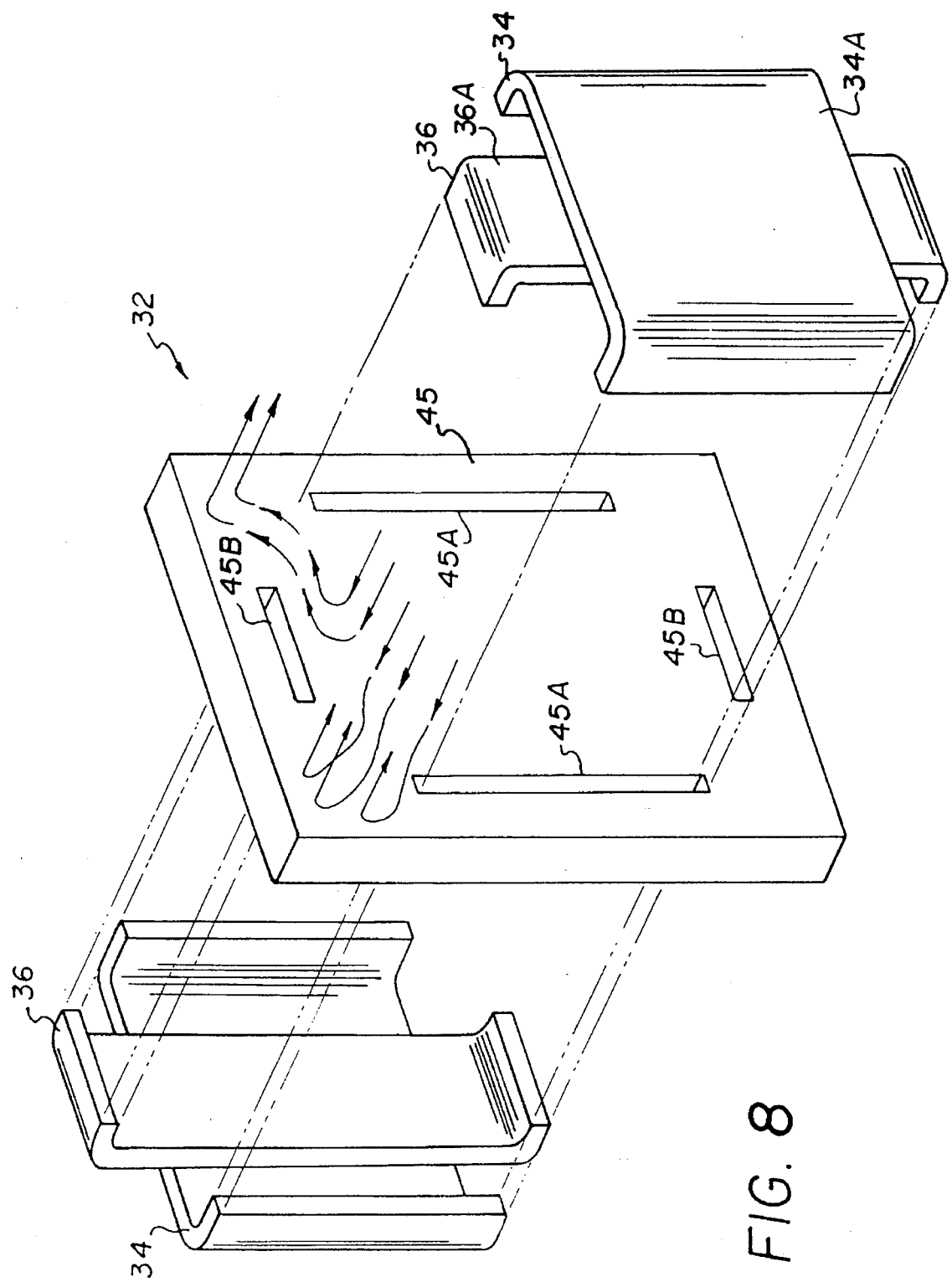
Figure 9:
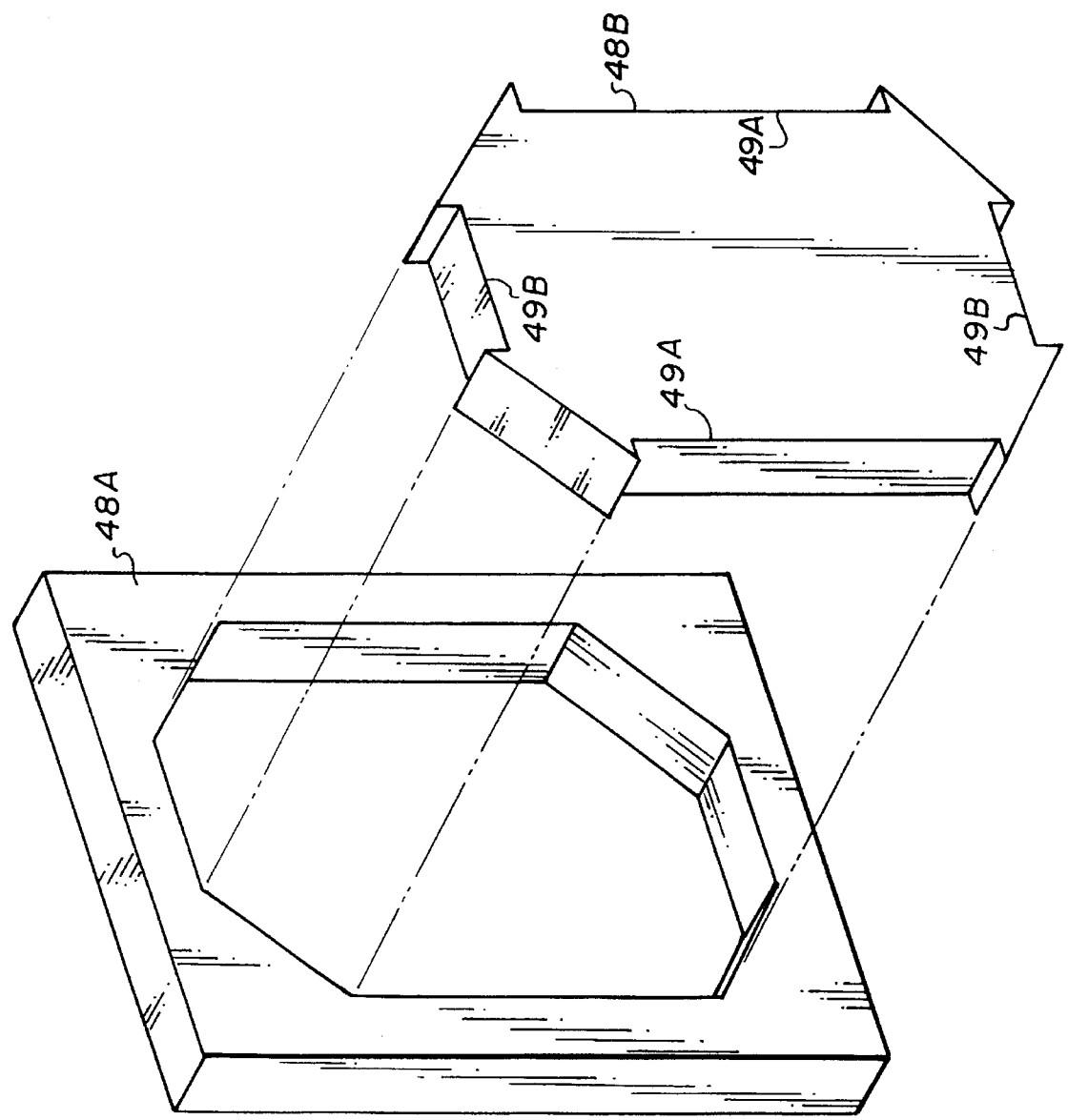
FIG. 9 is a perspective illustration of a two-piece magnetic flux-return plate.

According to an important aspect of the present invention, an increased motor efficiency for each of the focus and tracking motion is achieved by protecting all portions of the focus and tracking coils, except the one that is adjacent to the magnet, from being crossed by the magnetic flux produced by the permanent magnets 30. As shown in FIG. 6, when both the focus and tracking coils 34 and 36 are wound about a high permeability steel plate 40 of sufficient mass, the magnetic flux lines will be prevented (actually, shunted away) from crossing those coil portions behind the plate. If the latter is replaced by a plate 45 having a configuration as illustrated in FIG. 7, the side portions of both coils will also be protected from flux lines since the flux will tend to travel in the directions shown by the arrows in FIG. 8. Ideally, two pairs of vertical and horizontal cut-through windows 45A and 45B, respectively, are formed in plate 45 to allow passage of the focus and tracking coils. Rather than cross the air gaps defined by windows 45A and 45B, magnetic flux will return to the opposite pole of the permanent magnet 30 by traveling toward the corners of the plate 45 and return through the air from there. Obviously, to wind the coils through the windows 45A and 45B would require substantial time and effort. To simplify the winding process, it is preferred that plate 45 be composed of two parts, such as an outside frame 48A and an inner plate 48B, as shown in FIG. 9. Plate 48B has two pairs of cut-outs 49A, 49B to locate the focus and tracking coils, respectively. After both coils are wound about plate 48 B, the assembly is completed by sliding frame 48A over the coils.

Figure 10:
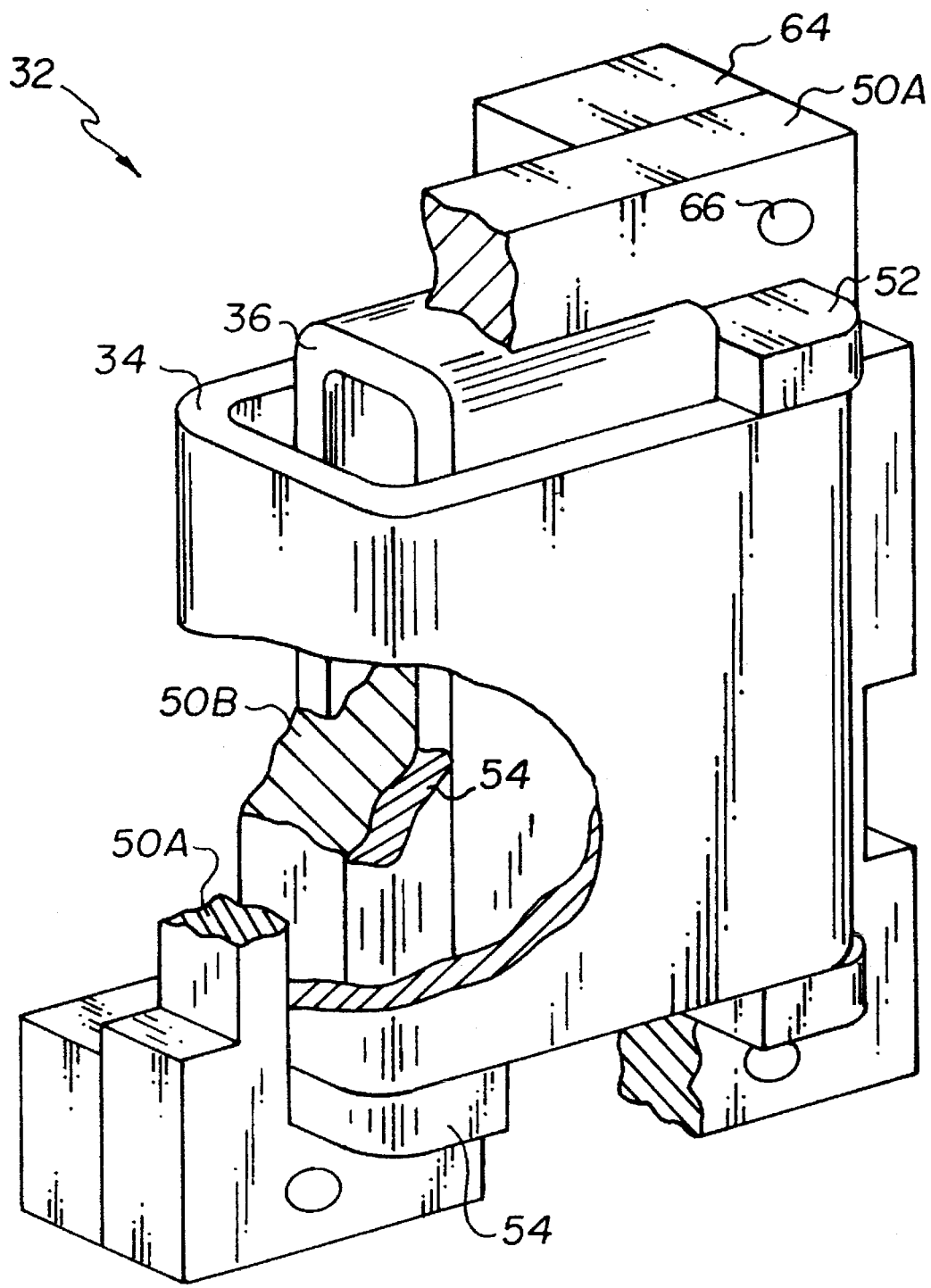
FIG. 10 is a perspective, partial cross-sectional illustration of a preferred coil assembly.

FIG. 10 illustrates a preferred assembly of the stationary coils. Here, focus coil 34 and tracking coil 36 are wound around a highly permeable steel plate 50B, the configuration of which is better shown in FIG. 11. Two guide rails 52 and 54 are glued or otherwise secured to the face of plate 50B to provide directional guidance while winding the focus coil 34. Preferably, these guide rails are made of a non-magnetic material, e.g., aluminum. The need for such guidance results from having wound the tracking coil 36 before the focus coil. After the focus and tracking coils are wound about plate 50B in mutually perpendicular directions, the high permeability steel frame 50 A is positioned around the coils and attached to plate 50B by mounting screws 60 (shown in FIG. 11).

Figure 11:
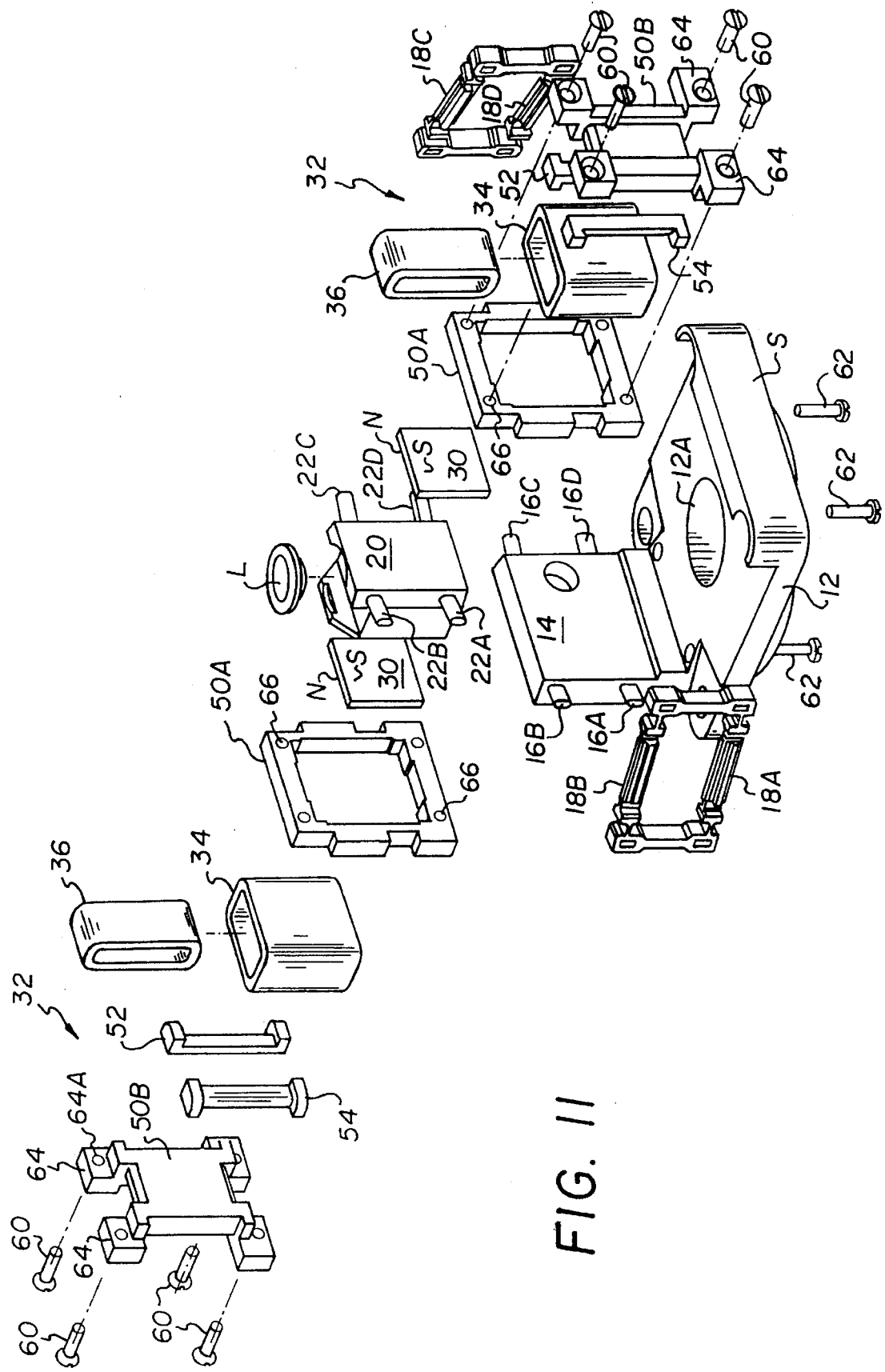
FIG. 11 is an exploded, perspective view of a preferred focus/tracking actuator.

All of the components described above, combined with additional features of the present invention, are demonstrated in the exploded view of FIG. 11. As mentioned above, objective lens L is housed in the lens housing 20 which is supported by two plastic injection molded suspensions 18A–18D. The stationary ends of the suspensions are connected to the upright portion 14 of base support S by tabs 16A–16D, and the free ends of the suspensions are attached to the lens housing by tabs 22A–22D. The two permanent magnets 30 are glued or otherwise secured to opposing sides of the lens housing 20 so that the north pole of one magnet faces outwardly, and the south pole of the other magnet faces outwardly, i.e., the magnets are oriented in such a way that direction of magnetization of the magnets coincide with each other. In combination with the stationary coil assemblies 32, the permanent magnets, while moving with the lens housing, displace the objective lens L in the focus and tracking directions, i.e., along the optical axis and along an axis normal thereto. Coil assemblies 32 are held together by screws 60 and are mounted on the base support S by screws 62. As shown, the inner plate portion 50B is provided with a plurality of ears mounting 64 having apertures 64A therein for receiving screws 60, and suitably threaded holes 66 are formed in the frame portion 50A for receiving screws 60 so that the two plate segments can be secured together.

From the foregoing description it will be appreciated that the focus/tracking actuator of the invention is characterized by the following advantages:

a) utilization of two moving magnet motors with improved flux carrying steel structure that results in strong magnetic fields and an overall high efficiency;

b) minimization of the restoring force between each magnet and steel parts for motion in focus and tracking directions;

c) structurally sound lens holder assembly resulting in a resonance free motion during focus and tracking displacement in a wide range of frequencies;

d) utilization of stationary wires for current delivery to coils;

e) mounting of coils on a heat sinking base allowing more power to be used for lens motion;

f) a high degree of simplicity and low number of parts;

g) low cost in production and assembly.

While the invention has been described with particular reference to preferred embodiments, it will be appreciated that various modifications and variations can be made without departing from the spirit of the invention. Such variations are intended to fall within the scope of the appended claims.

D—data storage disk
S—base support
L—objective lens
B—magnetic flux
F—force
i—current
12—horizontal portion of base support
12A—aperture in base
14—upright portion of base support
16A–16D—tabs on base for supporting lens housing suspensions
18A–18D—suspensions for supporting lens housing
20—lens housing
22A–22D—tabs on lens housing for supporting lens housing suspensions
25—linear motors
30—permanent magnets
32—coil assemblies
34—focus coil
36—tracking coil
40—flux-returning steel plate
45—flux-returning plate with slots
45A and 45B—slots
48A and 48B—steel plate segments
49A and 49B—notches
50A and 50B—steel plate segments
52 and 54—guides
60 and 62—mounting screws
64—mounting ears
6A—mounting apertures
66—threaded holes

What is claimed is:

1. A focus/tracking actuator includes:

(a) a stationary base support;

(b) a lens housing which supports an objective lens having an optical axis;

(c) mounting means for movably mounting said lens housing relative to said base support so that said objective lens is movable along two orthogonal axes;

(d) permanent magnet means secured to said lens housing and adapted to produce magnetic flux from a generally planar face surface thereof in a direction generally perpendicular to said optical axis;

(e) a selectively energizable first coil means mounted on said base support and adapted to produce, when energized with current, a first electromagnetic field which interacts with the magnetic flux of said permanent magnet means to cause said lens housing to move in a first direction relative to the base support; said first coil means being wound about a first axis generally parallel to said optical axis and having a first planar portion confronting the planar face surface of said permanent magnet means;

(f) a selectively energizable second coil means mounted on said base support and adapted to produce, when energized with current, a second electromagnetic field which interacts with the magnetic flux of said permanent magnet means to cause said lens housing to move in a second direction substantially perpendicular to said first direction, said second coil means being wound about an axis generally perpendicular to said first axis and having a first planar portion confronting the first planar portion of said first coil means;

(g) a magnetic flux-returning member means positioned to receive magnetic flux emitted by said permanent magnet means and crossing both of the respective first planar portions of said first and second coil means, said member means being configured and adapted to return a major portion of the received magnetic flux to the permanent magnet means while preventing such flux from interacting with the electromagnetic fields surrounding other current-carrying portions of said first and second coil means;

(h) wherein said magnetic flux-returning member includes a plate of magnetic high permeability material having a planar surface positioned in close proximity to the respective first planar portions of said first and second coil means, and (i) wherein said plate comprises a plurality of segments including an inner segment about which said first and second coil means are wound, and an outer frame that surrounds said inner segment and magnetically communicates therewith.

2. A focus/tracking actuator for controlling the focus condition and tracking position of a write/read beam of radiation on a recording element, said actuator comprising:

(a) a lens housing which supports an objective lens having an optical axis;

(b) mounting means for supporting said lens housing for movement along said optical axis and along a second axis perpendicular to said optical axis;

(c) permanent magnet means secured to said lens housing and adapted to produce magnetic flux;

(d) a selectively energizable first coil means adapted to produce, when energized with current, a first electromagnetic field which interacts with the magnetic flux of said permanent magnet means to cause said lens housing to move along said optical axis;

(e) a selectively energizable second coil means adapted to produce, when energized with current, a second electromagnetic field which interacts with the magnetic flux of said permanent magnet means to cause said lens housing to move along said second axis, said first and second coil means having respective windings which are wound about mutually perpendicular axes and having respective portions which confront each other;

(f) a magnetic flux-returning member positioned to receive magnetic flux emitted by said permanent magnet means and crossing said confronting portions of said first and second coil means, said magnetic flux-returning member being configured and adapted to return a major portion of the received magnetic flux to the permanent magnet means while preventing such flux from interacting with electromagnetic fields surrounding other current-carrying portions of said first and second coil means;

(g) wherein said magnetic flux-returning member comprises a plate of high permeability material having a planar surface positioned in close proximity to the respective confronting portions of said first and second coil means; and (h) wherein said plate comprises a plurality of segments including an inner segment about which said first and second coil means are wound, and an outer frame that surrounds said inner segment and magnetically communicates therewith.

3. The focus/tracking actuator as defined by claim 2 wherein said magnetic flux-returning member comprises a substantially rectangular steel plate having a plurality of slots therein, said slots being arranged to enable said first and second coil means to be wound about a central region of said plate.

4. A focus/tracking actuator includes:

(a) a stationary base support;

(b) a lens housing which supports an objective lens having an optical axis;

(c) mounting means for movably mounting said lens housing relative to said base support so that said objective lens is movable along two orthogonal axes;

(d) permanent magnet means secured to said lens housing and adapted to produce magnetic flux from a generally planar face surface thereof in a direction generally perpendicular to said optical axis;

(e) a selectively energizable first coil means mounted on said base support and adapted to produce, when energized with current, a first electromagnetic field which interacts with the magnetic flux of said permanent magnet means to cause said lens housing to move in a first direction relative to the base support; said first coil means being wound about a first axis generally parallel to said optical axis and having a first planar portion confronting the planar face surface of said permanent magnet means;

(f) a selectively energizable second coil means mounted on said base support and adapted to produce, when energized with current, a second electromagnetic field which interacts with the magnetic flux of said permanent magnet means to cause said lens housing to move in a second direction substantially perpendicular to said first direction, said second coil means being wound about an axis generally perpendicular to said first axis and having a first planar portion confronting the first planar portion of said first coil means; and (g) a magnetic flux-returning member means positioned to receive magnetic flux emitted by said permanent magnet means and crossing both of the respective first planar portions of said first and second coil means, said member means being configured and adapted to return a major portion of the received magnetic flux to the permanent magnet means while preventing such flux from interacting with the electromagnetic fields surrounding other current-carrying portions of said first and second coil means;

(h) wherein said magnetic flux-returning member includes a plate of high magnetic permeability steel having a planar surface positioned in close proximity to the respective first planar portions of said first and second coils; and (i) wherein said magnetic flux-returning member means comprises a substantially rectangular steel plate having a plurality of slots therein, said slots being arranged to enable said first and second coil means to be wound about a central region of said plate.

* * * * *